United States Patent Office 3,469,303
Patented Sept. 30, 1969

3,469,303
METHOD OF UNITING MECHANICAL PARTS BY WELDING
Pierre Carvallo, Amposta, Tarragone, Spain
Filed Mar. 4, 1966, Ser. No. 531,979
Claims priority, application France, Mar. 8, 1965,
8,277
Int. Cl. B23k 31/02
U.S. Cl. 29—484                                   9 Claims

ABSTRACT OF THE DISCLOSURE

A method of uniting mechanical parts by depositing, along a junction line between the parts, a sequence of weld regions forming a line intersecting with the surface of one part which has transverse undulations relative to said junction line.

---

This invention relates to an improved method of uniting, by welding and most notably by arc welding, mechanical parts such as a hub and its associated shaft.

Arc welding, as it is customarily applied, i.e. for obtaining unbroken and uniform welding seams, has the disadvantage of imparting brittleness to parts subjected to continuous or cyclic, static or dynamic loads. This is due mainly to the surface stresses set up by the welding, which are additive to the working loads and are substantially perpendicular to the weld seam. Such stresses are further aggravated by slight depressions which form at the edge of the weld and which may lead to fatigue cracks along that line and to ultimate fracturing of the shaft. A similar phenomenon can be observed on conveyor shafts rotating slowly under heavy load, as well as on the shafts of fans, turbines, pumps and the like, the rotors of which are subjected to alternating loads at high speed. Indeed, the danger of fracturing is aggravated by the fact that the slight depression referred to precedingly occurs at the edge of the weld.

This phenomenon generally precludes welding as a means of securing wheel hubs or turbines to shafts. On the other hand, welding offers the great advantage of simplicity and economy in comparison with the commonly used keying, splining and like methods.

The present invention has for its object to mitigate this danger of fracturing and to accordingly provide an improved welding method wherein the welds, instead of taking the form of a continuous and uniform seam along the general line of the junction to be made, take the form of a continuous or non-continuous sequence of welded areas of which one edge at least is formed with undulations or sawteeth standing out transversely to the general welding line. Preferably, said undulations or sawteeth are orientated in the direction of the forces to which the weld is subjected.

Thus, the major portion of the permanent joint which is formed is not at right angles to the forces to which the parts joined together are subjected. This markedly reduced the brittleness of the parts in the region of the welds.

The method of this invention is notably applicable for securing the rotors of fans, pumps, turbines, and the like, to their rotating shafts, for uniting parts subjected to stress reversals, such as spring blades, and for welding together static parts stressed by thermal expansion.

The description which follows with reference to the accompanying drawing in which are illustrated several non-limitative exemplary embodiments will give a clear understanding of how the invention can be carried into practice.

Figure 1:
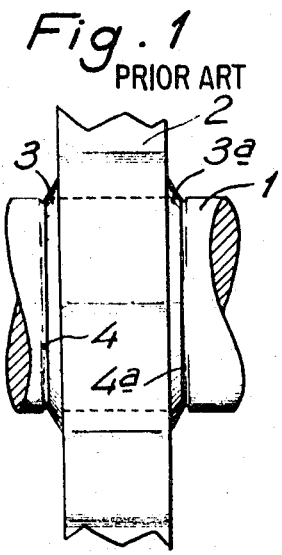
FIG. 1 shows in side elevation a shaft onto which a hub has been welded by a known method.

Referring first to FIG. 1, there is shown therein a transmission shaft 1 fitted with a hub or wheel 2 which is welded thereto by a conventional method utilizing two regular and unbroken annular weld seams 3, 3a, formed respectively adjacent the two apparent circles at which the sides of wheel 2 are joined to the surface of shaft 1. Experience shows that a weld made in this way will make the shaft fatigue-brittle and that fracturing will occur along the lines 4, 4a where the weld seams blend with the surface of the shaft. Such fractures must be ascribed to the fact that the weld sets up surface stresses perpendicular to the lines 4, 4a that are additive to the stresses normally experienced by the metal due to bending in response to the load applied on wheel 2.

Figures 2, 3:
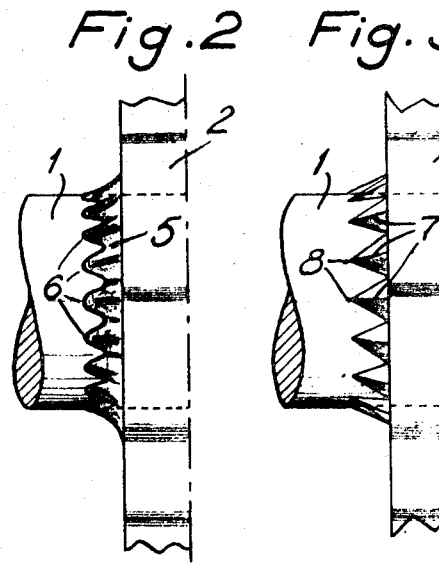
FIGS. 2 to 4 show various possible ways of carrying the subject welding method of the invention into practice in the case of the parts considered in FIG. 1.

In accordance with the welding method of this invention, shaft 1 and wheel 2 are welded together on either side, without danger of fracturing, by means of a continuous seam 5 of which the edge in contact with shaft 1 is formed with undulations 6 substantially parallel with the axis of shaft 1 (see FIG. 2).

Reference to FIG. 3 shows an alternative form of embodiment in which the weld seam assumes the form of a sequence of contiguous weld areas 7 which jointly terminate, at their edges in contact with shaft 1, in a sawtooth line the points 8 of which project parallel to the axis of shaft 1.

Figure 4:
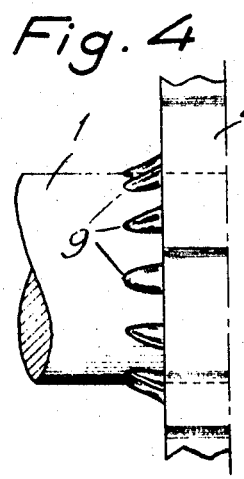

In yet another alternative embodiment shown in FIG. 4, the weld consists of a series of separate weld areas 9 which blend with shaft 1 in parallelism with the axis thereof.

Figure 5:
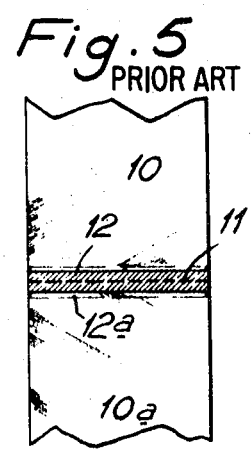
FIG. 5 shows a two-part flat blade, such as a spring, welded by a known method.

Reference is now had to FIG. 5 in which is illustrated an example of a conventional method of welding together two flat metal strips 10, 10a, such as spring blades, which are rendered brittle by the known weld seam 11 and tend to fracture along the lines 12, 12a, along which seam 11 joins respectively with strips 10, 10a.

Figure 6:
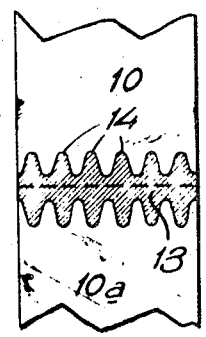
FIGS. 6 and 7 show the blade of FIG. 5 welded in two different ways by the subject method of the invention.

In contradistinction, FIG. 6 shows the manner in accordance with the invention of uniting strips 10, 10a by means of a continuous weld seam 13 having peaks or undulations 14 projecting parallel to the direction of the forces, or at right angles to the general weld line.

Figure 7:
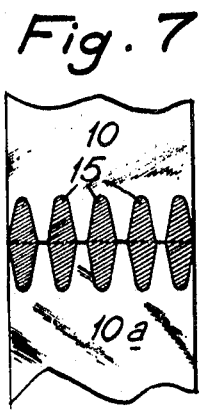

Reference is lastly had to FIG. 7 for an alternative embodiment in which the strips 10, 10a are welded together by a set of separate weld areas 15 arranged perpendicularly to the welded edges of the strips.

Clearly, many detail modifications could be made to the specific forms of embodiment hereinbefore described, without departing from the scope of the invention. Obviously, in its broader aspects, the method of the invention is applicable to all direct or indirect welding methods and it goes without saying that there are no restrictions as to the nature of the parts to be welded together.

What I claim is:

1. A method comprising joining two members along a junction line, said method including the steps of applying a weld to said members along said junction line to join the members, and forming the weld from successive regions having an exposed surface with one edge which intersects the surface of one member with transverse undulations relative to the junction line.

2. A method as claimed in claim 1 wherein said successive regions are contiguous and jointly constitute a continuous weld seam.

3. A method as claimed in claim 1 wherein said successive regions are discrete and are interrupted along the junction line.

4. A method as claimed in claim 1 wherein the successive regions are formed with a generally inverted V-shaped cross section in a plane parallel to the junction line.

5. A method as claimed in claim 1 wherein the undulations lie substantially in the direction of the forces to which the junction line is to be subjected.

6. A method as claimed in claim 1 wherein the opposite edge of the exposed weld surface intersects the surface of the other member along a line parallel to said junction line.

7. A method as claimed in claim 1 wherein one member is a shaft and the other member is a rotatable member which is secured to the shaft by the weld along a circular junction line.

8. A method as claimed in claim 1 wherein said members are flat and are joined by the weld along a rectilinear junction line.

9. A method as claimed in claim 8 wherein the members are subjected to stresses directed perpendicular to said junction line and which vary in magnitude with respect to time.

References Cited

UNITED STATES PATENTS

| | | | |
|---|---|---|---|
| 1,425,529 | 8/1922 | McClintock | 219—137 X |
| 1,700,319 | 1/1929 | Kjekstad | 219—127 X |
| 1,997,969 | 4/1935 | Hopkins | 219—137 |
| 2,142,797 | 1/1939 | Murphy | 219—137 X |
| 2,163,439 | 6/1939 | Somerville | 219—137 |
| 2,446,922 | 8/1948 | Grunder | 219—137 X |
| 2,569,632 | 10/1951 | Hauck | 287—20.2 |
| 2,779,612 | 1/1957 | Edelen | 287—20.2 |

FOREIGN PATENTS 1,436,658 11/1966 France.

JOHN F. CAMPBELL, Primary Examiner

J. L. CLINE, Assistant Examiner

U.S. Cl. X.R.

29—479